United States Patent
Wang et al.

(10) Patent No.: US 11,438,242 B2
(45) Date of Patent: Sep. 6, 2022

(54) METHOD FOR PROVIDING PAAS SERVICE, MANAGEMENT SYSTEM, AND CLOUD COMPUTING SERVICE ARCHITECTURE

(71) Applicant: Huawei Cloud Computing Technologies Co., Ltd., Guizhou (CN)

(72) Inventors: Fei Wang, Shenzhen (CN); Xionghui He, Shenzhen (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 0 days.

(21) Appl. No.: 16/589,918

(22) Filed: Oct. 1, 2019

(65) Prior Publication Data

US 2020/0036601 A1   Jan. 30, 2020

Related U.S. Application Data

(63) Continuation of application No. PCT/CN2018/074278, filed on Jan. 26, 2018.

(30) Foreign Application Priority Data

Apr. 1, 2017   (CN) .......................... 201710216079.5

(51) Int. Cl.
*H04L 41/50* (2022.01)
*G06F 9/455* (2018.01)
(Continued)

(52) U.S. Cl.
CPC .......... *H04L 41/50* (2013.01); *G06F 9/45558* (2013.01); *G06F 9/5077* (2013.01);
(Continued)

(58) Field of Classification Search
CPC ..... H04L 41/50; H04L 63/0853; H04L 67/10; G06F 9/45558; G06F 9/5077; G06F 2009/45595
See application file for complete search history.

(56) References Cited

U.S. PATENT DOCUMENTS

| 8,448,171 B2* | 5/2013 | Donnellan | .......... H04L 61/2007 718/1 |
| 8,959,195 B1* | 2/2015 | Niranjan | ............. H04L 41/5067 709/229 |

(Continued)

FOREIGN PATENT DOCUMENTS

| CN | 103167003 A | 6/2013 |
| CN | 103544319 A | 1/2014 |

(Continued)

OTHER PUBLICATIONS

Machine Translation and Abstract of Chinese Publication No. CN103544319, Jan. 29, 2014, 15 pages.

(Continued)

*Primary Examiner* — Ninos Donabed
(74) *Attorney, Agent, or Firm* — Conley Rose, P.C.

(57) ABSTRACT

A method comprising receiving a platform as a service (PaaS) operation request sent by a first real tenant, where the PaaS operation request is used to indicate a PaaS operation intended for a PaaS resource, determining information about a first virtual tenant corresponding to the first real tenant, and controlling, based on the PaaS operation request and the information about the first virtual tenant, an infrastructure as a service (IaaS) management system to process an IaaS operation corresponding to the PaaS operation. According to the method for providing a PaaS service in this application, one corresponding virtual tenant is introduced for each real tenant, and an infrastructure resource is managed using the virtual tenant.

17 Claims, 7 Drawing Sheets

(51) Int. Cl.
  *G06F 9/50* (2006.01)
  *H04L 9/40* (2022.01)
  *H04L 67/10* (2022.01)
(52) U.S. Cl.
  CPC .......... *H04L 63/0853* (2013.01); *H04L 67/10* (2013.01); *G06F 2009/45595* (2013.01)

(56) References Cited

U.S. PATENT DOCUMENTS

| | | | | |
|---|---|---|---|---|
| 9,961,015 | B2* | 5/2018 | Shibayama | H04L 47/78 |
| 10,768,920 | B2* | 9/2020 | Fontoura | G06F 8/65 |
| 2005/0192999 | A1* | 9/2005 | Cook | G06F 16/9566 |
| | | | | 707/E17.115 |
| 2011/0277026 | A1* | 11/2011 | Agarwal | H04L 63/0815 |
| | | | | 726/8 |
| 2012/0221346 | A1* | 8/2012 | Acker | G06Q 10/00 |
| | | | | 705/2 |
| 2012/0221354 | A1* | 8/2012 | Wall | G16H 40/67 |
| | | | | 705/3 |
| 2012/0221535 | A1* | 8/2012 | Dubbels | G06F 16/27 |
| | | | | 707/694 |
| 2012/0221728 | A1* | 8/2012 | Dubbels | G16H 30/40 |
| | | | | 709/226 |
| 2013/0163041 | A1* | 6/2013 | Sato | H04N 1/32122 |
| | | | | 358/1.15 |
| 2014/0007189 | A1* | 1/2014 | Huynh | H04L 67/1095 |
| | | | | 726/3 |
| 2014/0074905 | A1 | 3/2014 | Schincariol et al. | |
| 2014/0075031 | A1 | 3/2014 | Doering et al. | |
| 2014/0280437 | A1 | 9/2014 | Eder | |
| 2014/0280948 | A1* | 9/2014 | Schmidt | G06F 9/45558 |
| | | | | 709/226 |
| 2015/0063166 | A1 | 3/2015 | Sif et al. | |
| 2015/0120893 | A1* | 4/2015 | Sapaliga | H04L 41/0856 |
| | | | | 709/222 |
| 2015/0120938 | A1* | 4/2015 | Mordani | H04L 41/5054 |
| | | | | 709/226 |
| 2015/0121483 | A1* | 4/2015 | Perez | H04L 41/0806 |
| | | | | 726/5 |
| 2015/0215308 | A1* | 7/2015 | Manolov | H04L 63/168 |
| | | | | 709/229 |
| 2015/0309780 | A1* | 10/2015 | Ruehl | H04L 67/1095 |
| | | | | 717/176 |
| 2016/0043968 | A1* | 2/2016 | Jacob | G06F 9/5061 |
| | | | | 709/226 |
| 2016/0197850 | A1* | 7/2016 | Peng | H04L 41/5003 |
| | | | | 709/226 |
| 2016/0197995 | A1 | 7/2016 | Lu et al. | |
| 2016/0205518 | A1* | 7/2016 | Patel | H04L 67/1002 |
| | | | | 455/518 |
| 2016/0306647 | A1* | 10/2016 | Xia | G06F 9/45537 |
| 2016/0344687 | A1* | 11/2016 | Rong | H04L 61/2015 |
| 2017/0134339 | A1* | 5/2017 | Bortnikov | G06F 9/45558 |
| 2017/0187590 | A1* | 6/2017 | Cook | H04L 43/08 |
| 2017/0230306 | A1* | 8/2017 | Cropper | G06F 9/5083 |
| 2017/0329957 | A1* | 11/2017 | Vepa | G06F 21/34 |
| 2017/0344388 | A1* | 11/2017 | Ramos da Rocha | |
| | | | | G06F 9/44505 |
| 2018/0026893 | A1* | 1/2018 | Jeuk | H04L 41/5051 |
| | | | | 370/236 |
| 2018/0026944 | A1* | 1/2018 | Phillips | H04L 63/1433 |
| | | | | 726/4 |
| 2018/0316551 | A1* | 11/2018 | Subramani Nadar | |
| | | | | H04L 41/5054 |
| 2019/0139605 | A1* | 5/2019 | Ge | G11C 13/0069 |
| 2019/0235909 | A1* | 8/2019 | Jin | H04L 41/046 |
| 2019/0245782 | A1* | 8/2019 | Jin | H04L 49/252 |
| 2019/0354388 | A1* | 11/2019 | Mitra | G06F 9/547 |

FOREIGN PATENT DOCUMENTS

| | | |
|---|---|---|
| CN | 104683125 A | 6/2015 |
| CN | 104883369 A | 9/2015 |
| CN | 105653370 A | 6/2016 |
| CN | 105893139 A | 8/2016 |
| CN | 105900518 A | 8/2016 |
| CN | 106294435 A | 1/2017 |
| CN | 106354544 A | 1/2017 |

OTHER PUBLICATIONS

Machine Translation and Abstract of Chinese Publication No. CN104683125, Jun. 3, 2015, 15 pages.
Machine Translation and Abstract of Chinese Publication No. CN105653370, Jun. 8, 2016, 11 pages.
Machine Translation and Abstract of Chinese Publication No. CN106294435, Jan. 4, 2017, 8 pages.
Machine Translation and Abstract of Chinese Publication No. CN106354544, Jan. 25, 2017, 21 pages.
He, Y., et al., "Analysis of Construction Profiling Based on Multi-tenant Architecture PaaS," Digital Communication, Jun. 2012, with English abstract, 4 pages.
Foreign Communication From A Counterpart Application, Chinese Application No. 201710216079.5, Chinese Office Action dated Nov. 28, 2019, 3 pages.
Foreign Communication From A Counterpart Application, Chinese Application No. 201710216079.5, Chinese Search Report dated Nov. 11, 2019, 2 pages.
Foreign Communication From A Counterpart Application, European Application No. 18774532.8, Extended European Search Report dated Dec. 9, 2019, 8 pages.
Foreign Communication From A Counterpart Application, PCT Application No. PCT/CN2018/074278, English Translation of International Search Report dated Apr. 4, 2018, 2 pages.
Foreign Communication From A Counterpart Application, PCT Application No. PCT/CN2018/074278, English Translation of Written Opinion dated Apr. 4, 2018, 5 pages.

* cited by examiner

500

┌─────────────────────────────────────────────────────────┐
│ A PaaS management system receives a PaaS operation request sent │ 510
│ by a first real tenant, where the PaaS operation request is used to │
│ indicate a PaaS operation intended for a PaaS resource │
└─────────────────────────────────────────────────────────┘
                            │
                            ▼
┌─────────────────────────────────────────────────────────┐
│ The PaaS management system determines information about a first │
│ virtual tenant corresponding to the first real tenant, where there are │ 520
│ one-to-one correspondences between real tenants and virtual tenants, │
│ and the first real tenant and the first virtual tenant are a pair in the │
│ one-to-one correspondences │
└─────────────────────────────────────────────────────────┘
                            │
                            ▼
┌─────────────────────────────────────────────────────────┐
│ The PaaS management system controls, based on the PaaS operation │
│ request and the information about the first virtual tenant by using the │ 530
│ first virtual tenant, an IaaS management system of a cloud │
│ computing service architecture to process an IaaS operation │
│ corresponding to the PaaS operation │
└─────────────────────────────────────────────────────────┘

FIG. 4

METHOD FOR PROVIDING PAAS SERVICE, MANAGEMENT SYSTEM, AND CLOUD COMPUTING SERVICE ARCHITECTURE

CROSS-REFERENCE TO RELATED APPLICATIONS

This application is a continuation application of International Patent Application No. PCT/CN2018/074278, filed on Jan. 26, 2018, which claims priority to Chinese Patent Application No. 201710216079.5, filed on Apr. 1, 2017. The disclosures of the aforementioned applications are hereby incorporated by reference in their entireties.

TECHNICAL FIELD

This application relates to the field of cloud computing services, and more specifically, to a method for providing a platform as a service (PaaS) service, a management system, and a cloud computing service architecture.

BACKGROUND

In cloud computing services, services provided by a cloud computing service architecture for a user usually include an infrastructure as a service (IaaS) service, a PaaS service, a software as a service (SaaS) service, and the like.

When a user leases both the PaaS service and the IaaS service in the cloud computing service architecture, resource management performed by the IaaS service and resource management performed by the PaaS service conflict with each other in an existing management system. The IaaS service manages an infrastructure resource of the user, for example, at least one of infrastructure resources such as a central processing unit (CPU), a memory, a storage medium, a network, and a router, and the infrastructure resource of the user includes an infrastructure resource of a software service provided for running the PaaS service. In addition, the PaaS service is based on the IaaS service, and the PaaS service deploys a common software service on an infrastructure resource provided by the IaaS service. Therefore, both the PaaS service and the IaaS service can manage infrastructure resources together, and consequently a conflict occurs between management performed by the PaaS service and management performed by the IaaS service. For example, the infrastructure resource of the software service provided for running the PaaS service can be deleted on a service page of the IaaS service. For another example, a network policy of the IaaS service may affect internal communication of the PaaS service.

SUMMARY

This application provides a method for providing a PaaS service, a management system, and a cloud computing service architecture, so that not only a multi-tenant requirement is met, but also a conflict problem existing between infrastructure resource management performed by an IaaS service and infrastructure resource management performed by a PaaS service can be resolved.

According to a first aspect, a method for providing a platform as a service PaaS service is provided. The method includes receiving, by a PaaS management system, a PaaS operation request sent by a first real tenant, where the PaaS operation request is used to indicate a PaaS operation intended for a PaaS resource determining, by the PaaS management system, information about a first virtual tenant corresponding to the first real tenant, where there are one-to-one correspondences between real tenants and virtual tenants, and the first real tenant and the first virtual tenant are a pair in the one-to-one correspondences, and controlling, by the PaaS management system based on the PaaS operation request and the information about the first virtual tenant using the first virtual tenant, an infrastructure as a service IaaS management system to process an IaaS operation corresponding to the PaaS operation.

According to the method for providing a PaaS service in the first aspect, one corresponding virtual tenant is introduced for each real tenant in the PaaS management system, so that the PaaS management system manages an infrastructure resource using the virtual tenant. The first real tenant and the first virtual tenant are a pair in a plurality of one-to-one correspondences. Therefore, the first real tenant is isolated, using the virtual tenant corresponding to the first real tenant, from another real tenant in management performed by a PaaS service. In this way, management of a plurality of tenants is isolated from each other, and a conflict problem existing between infrastructure resource management performed by an IaaS service and infrastructure resource management performed by a PaaS service can be further resolved.

In a possible implementation of the first aspect, the IaaS management system is a management system configured to process an IaaS operation in a cloud computing service architecture, the cloud computing service architecture provides an IaaS service for the first real tenant based on a first infrastructure resource group, only the first real tenant has permission to manage an infrastructure resource in the first infrastructure resource group, the PaaS management system is a management system configured to process a PaaS operation in the cloud computing service architecture, the cloud computing service architecture provides a PaaS service for the first real tenant based on a second infrastructure resource group, and only the first virtual tenant has permission to manage an infrastructure resource in the second infrastructure resource group. In this possible implementation, in the cloud computing service architecture, an infrastructure resource corresponding to an IaaS operation request initiated by a real tenant using the IaaS management system and an infrastructure resource corresponding to a PaaS operation request initiated by the real tenant using the PaaS management system are isolated from each other. This can not only resolve a conflict problem existing between management performed by the IaaS service and management performed by the PaaS service but also improve security of a cloud computing service.

In a possible implementation of the first aspect, a PaaS instance provided by the cloud computing service architecture for the first real tenant includes a management network adapter, and the method further includes performing, by the PaaS management system, management communication between infrastructure resources in the second infrastructure resource group using the management network adapter. In this possible implementation, the PaaS management system performs internal communication of the PaaS service and control communication of a background of the PaaS management system using the management network adapter.

In a possible implementation of the first aspect, the PaaS instance provided by the cloud computing service architecture for the first real tenant includes a data network adapter, and the method further includes performing, by the PaaS management system, data communication between the PaaS instance and the first infrastructure resource group using the data network adapter. In this possible implementation, the PaaS management system performs external communication of the PaaS service using the data network adapter.

In a possible implementation of the first aspect, the receiving, by a PaaS management system, a PaaS operation request sent by a first real tenant includes receiving, by the PaaS management system, a PaaS operation request that instructs to apply for the PaaS instance and that is sent by the first real tenant, and the controlling, by the PaaS management system based on the PaaS operation request and the information about the first virtual tenant using the first virtual tenant, an infrastructure as a service IaaS management system to process an IaaS operation corresponding to the PaaS operation includes determining, by the PaaS management system based on the PaaS operation request, that the IaaS operation corresponding to the PaaS operation is creating the PaaS instance and creating the data network adapter, and controlling, by the PaaS management system using the first virtual tenant, the IaaS management system to create the PaaS instance and create the data network adapter. This possible implementation is applicable to a case in which a real tenant applies for a PaaS instance for the first time.

In a possible implementation of the first aspect, the receiving, by a PaaS management system, a PaaS operation request sent by a first real tenant includes receiving, by the PaaS management system, a PaaS operation request that instructs to change the PaaS instance and that is sent by the first real tenant, and the controlling, by the PaaS management system based on the PaaS operation request and the information about the first virtual tenant using the first virtual tenant, an infrastructure as a service IaaS management system to process an IaaS operation corresponding to the PaaS operation includes determining, by the PaaS management system based on the PaaS operation request, that the IaaS operation corresponding to the PaaS operation is changing a parameter of the PaaS instance, and controlling, by the PaaS management system using the first virtual tenant, the IaaS management system to change the parameter of the PaaS instance. This possible implementation is applicable to a case in which a real tenant changes a PaaS instance.

According to a second aspect, a platform as a service PaaS management system is provided. The PaaS management system includes a receiving module configured to receive a PaaS operation request sent by a first real tenant, where the PaaS operation request is used to indicate a PaaS operation intended for a PaaS resource, and a processing module configured to determine information about a first virtual tenant corresponding to the first real tenant, where there are one-to-one correspondences between real tenants and virtual tenants, and the first real tenant and the first virtual tenant are a pair in the one-to-one correspondences, and the processing module is further configured to control, based on the PaaS operation request and the information about the first virtual tenant using the first virtual tenant, an infrastructure as a service IaaS management system to process an IaaS operation corresponding to the PaaS operation.

In a possible implementation of the second aspect, the IaaS management system is a management system configured to process an IaaS operation in a cloud computing service architecture, the cloud computing service architecture provides an IaaS service for the first real tenant based on a first infrastructure resource group, only the first real tenant has permission to manage an infrastructure resource in the first infrastructure resource group, the PaaS management system is a management system configured to process a PaaS operation in the cloud computing service architecture, the cloud computing service architecture provides a PaaS service for the first real tenant based on a second infrastructure resource group, and only the first virtual tenant has permission to manage an infrastructure resource in the second infrastructure resource group.

In a possible implementation of the second aspect, a PaaS instance provided by the cloud computing service architecture for the first real tenant includes a management network adapter, and the management network adapter is configured to perform management communication between infrastructure resources in the second infrastructure resource group.

In a possible implementation of the second aspect, the PaaS instance provided by the cloud computing service architecture for the first real tenant includes a data network adapter, and the data network adapter is configured to perform data communication between the PaaS instance and the first infrastructure resource group.

In a possible implementation of the second aspect, the receiving module is further configured to receive a PaaS operation request that instructs to apply for the PaaS instance and that is sent by the first real tenant, and the processing module is further configured to determine, based on the PaaS operation request, that the IaaS operation corresponding to the PaaS operation is creating the PaaS instance and creating the data network adapter, and control, using the first virtual tenant, the IaaS management system to create the PaaS instance and create the data network adapter.

In a possible implementation of the second aspect, the receiving module is further configured to receive a PaaS operation request that instructs to change the PaaS instance and that is sent by the first real tenant, and the processing module is further configured to determine, based on the PaaS operation request, that the IaaS operation corresponding to the PaaS operation is changing a parameter of the PaaS instance, and control, using the first virtual tenant, the IaaS management system to change the parameter of the PaaS instance.

According to a third aspect, a cloud computing service architecture is provided. The cloud computing service architecture provides an infrastructure as a service IaaS service and a platform as a service PaaS service for a first real tenant, the cloud computing service architecture includes a first infrastructure resource group and a second infrastructure resource group, the cloud computing service architecture provides the IaaS service for the first real tenant based on the first infrastructure resource group, only the first real tenant has permission to manage an infrastructure resource in the first infrastructure resource group, the cloud computing service architecture provides the PaaS service for the first real tenant based on the second infrastructure resource group, only a first virtual tenant has permission to manage an infrastructure resource in the second infrastructure resource group, and there are one-to-one correspondences between real tenants and virtual tenants, and the first real tenant and the first virtual tenant are a pair in the one-to-one correspondences.

In a possible implementation of the third aspect, the second infrastructure resource group includes a PaaS instance, the PaaS instance includes a data network adapter, and the data network adapter is configured to perform data communication between the PaaS instance and the first infrastructure resource group.

According to a fourth aspect, a platform as a service PaaS management system is provided. The PaaS management system includes a network interface, a processor, and a memory, the memory is configured to store an instruction, the processor and the network interface are configured to execute the instruction stored in the memory, and when the processor and the network interface execute the instruction stored in the memory, the PaaS management system is configured to perform the method for providing a PaaS service in any one of the first aspect and the implementations of the first aspect.

According to a fifth aspect, a computer storage medium is provided. The computer storage medium is configured to store a computer program, and the computer program includes an instruction used to perform the method for providing a PaaS service in any one of the first aspect and the implementations of the first aspect. The computer storage medium includes but is not limited to a read-only memory (ROM), a random access memory (RAM), a flash memory, a hard disk drive (HDD), or a solid-state drive (SSD).

According to a sixth aspect, a computer program product is provided. The computer program product includes a program instruction. When the computer program product is executed by a computing device, the computing device performs the method for providing a PaaS service in any one of the first aspect and the implementations of the first aspect. The computer program product may be a software installation package. When the method for providing a PaaS service in any one of the first aspect and the implementations of the first aspect needs to be used, the computer program product may be downloaded, and may be executed on the computing device.

It should be understood that the real tenant in this application is a tenant who leases the PaaS service and who can initiate a PaaS operation request using the PaaS management system. However, the real tenant does not have permission to manage an infrastructure resource finally corresponding to the PaaS operation request. In other words, the real tenant does not have permission to manage, using the IaaS management system, the infrastructure resource corresponding to the PaaS operation request. Alternatively, the real tenant may be a tenant who leases the IaaS service and who can initiate an IaaS operation request using the IaaS management system. The real tenant has permission to manage an infrastructure resource corresponding to the IaaS operation request initiated by the real tenant using the IaaS management system.

It should be understood that the virtual tenant in this application is not a tenant who actually exists, but a tenant that is allocated to the real tenant by the PaaS management system, that is used as a proxy for the real tenant, and that has permission to manage the infrastructure resource corresponding to the PaaS operation request. In other words, the virtual tenant has permission to manage, using the IaaS management system, the infrastructure resource corresponding to the PaaS operation request. However, the virtual tenant does not have permission to manage the infrastructure resource corresponding to the IaaS operation request initiated by the real tenant using the IaaS management system.

BRIEF DESCRIPTION OF DRAWINGS

FIG. 4 is a schematic flowchart of a method for providing a PaaS service according to an embodiment of this application.

DESCRIPTION OF EMBODIMENTS

Figure 1:
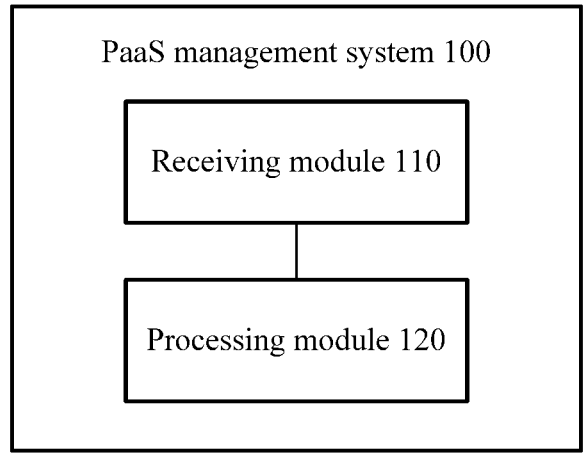
FIG. 1 is a schematic block diagram of a PaaS management system according to an embodiment of this application.

The following describes the technical solutions in this application with reference to the accompanying drawings.

In cloud computing services, services provided by a cloud computing service architecture for a user usually include an IaaS service, a PaaS service, a SaaS service, and the like.

The IaaS service provides, in a form of a service, the user with permission to use at least one of infrastructure resources such as a CPU, a memory, a storage medium, a network, and a router. The user does not need to care about or manage any specific hardware resource, and the service saves a place and manpower and reduces maintenance costs. In addition, the IaaS service provides pay-as-you-grow convenience and subscribe-and-use convenience for the user, significantly improving flexibility of managing information technology (IT) infrastructure resources by the user.

The PaaS service provides the user with an IaaS service-based software platform in a form of a service. The PaaS service invokes a hardware resource using an application programming interface (API) provided by the IaaS service. The hardware resource integrates with a common software business capability, to provide the user with complete infrastructure resource application services, for example, a database service, a messaging service, and a cache service. With the PaaS service, the user can focus more on a software service on an application software platform, without paying attention to application, expansion, and maintenance of infrastructure resources.

The SaaS service is a mode in which a software service is provided using the Internet. A vendor deploys all software on a server of the vendor. The user may subscribe to a required software service from the vendor based on an actual requirement of the user using the Internet.

A multi-tenancy technology, or referred to as a multi-leasing technology, is a software architecture technology. The multi-tenancy technology explores and implements how to share a same system or program component in a multi-tenant environment while still ensuring data isolation between tenants.

The multi-tenancy technology is widely used in the SaaS service and the IaaS service, and becomes a key technology of the SaaS service. In consensus of the industry, the multi-tenancy technology is generally divided into different categories by isolation degree a hardware virtualization multi-tenancy technology, a database isolation multi-tenancy technology, a database sharing multi-tenancy technology, and the like. With reference to classification of an IT consulting company Gartner (Gartner), more detailed classification may be performed for the multi-tenancy technology. For example, the multi-tenancy technology may be further divided into categories such as a hardware sharing multi-tenancy technology, an operating system (Operating System, OS) sharing multi-tenancy technology, a database sharing multi-tenancy technology, and an everything sharing multi-tenancy technology.

In the industry, a hardware sharing method is selected to implement the multi-tenancy technology for most IaaS services for the following reasons, first, a hardware virtualization technology is mature and of moderate difficulty, and second, hardware virtualization accords with an idea of the IaaS service. The SaaS service has an obvious commonality in user requirements because businesses of the SaaS service are highly consistent, in other words, the provided businesses are oriented to a specific field. Most of companies with a profound data sharing capability, for example, Google, select the everything sharing multi-tenancy technology.

When the user leases both the PaaS service and the IaaS service in the cloud computing service architecture, resource management performed by the IaaS service and resource management performed by the PaaS service conflict with each other in an existing management system. The IaaS service manages an infrastructure resource of the user, for example, at least one of infrastructure resources such as a CPU, a memory, a storage medium, a network, and a router, and the infrastructure resource of the user includes an infrastructure resource of a software service provided for running the PaaS service. In addition, the PaaS service is based on the IaaS service, and the PaaS service deploys a common software service on an infrastructure resource provided by the IaaS service. Therefore, both the PaaS service and the IaaS service can manage infrastructure resources together, and consequently a conflict occurs between management performed by the PaaS service and management performed by the IaaS service. For example, the infrastructure resource of the software service provided for running the PaaS service can be deleted on a service page of the IaaS service. For another example, a network policy of the IaaS service may affect internal communication of the PaaS service.

In addition, to reduce management work of the user, the PaaS service provides the user only with a service address and a port. However, in an existing solution, when a user leases both the PaaS service and the IaaS service, for the user, an infrastructure resource corresponding to the PaaS service is exposed to the user in an IaaS management system. As a result, the user needs to care about resulting problems, for example, port security and a firewall access rule. These resulting tasks are not originally required by the user, and also bring a security risk to the user.

To resolve the foregoing problem, this application provides, on the basis of a hardware sharing IaaS, an improved PaaS management system that can meet a multi-tenant requirement. FIG. 1 is a schematic block diagram of a PaaS management system 100 according to an embodiment of this application. The PaaS management system 100 may include a receiving module 110 configured to receive a PaaS operation request sent by a first real tenant, where the PaaS operation request is used to indicate a PaaS operation intended for a PaaS resource, and a processing module 120 configured to determine information about a first virtual tenant corresponding to the first real tenant, where there are one-to-one correspondences between real tenants and virtual tenants, and the first real tenant and the first virtual tenant are a pair in the one-to-one correspondences, and the processing module 120 is further configured to control, based on the PaaS operation request and the information about the first virtual tenant using the first virtual tenant, an IaaS management system to process an IaaS operation corresponding to the PaaS operation.

A cloud computing service architecture may provide a PaaS service for the first real tenant using the PaaS management system 100 in this embodiment of this application. The cloud computing service architecture may provide an IaaS service for the first real tenant using the IaaS management system.

The receiving module 110 in the PaaS management system 100 may specifically include a PaaS tenant service component that is configured to interact with a real tenant. The processing module 120 may specifically include some functions of the PaaS tenant service component, a virtual tenant resource pool component that manages the one-to-one correspondences between real tenants and virtual tenants, and a PaaS tenant proxy component that is used as a proxy for the real tenant to perform an IaaS operation.

Figure 2:
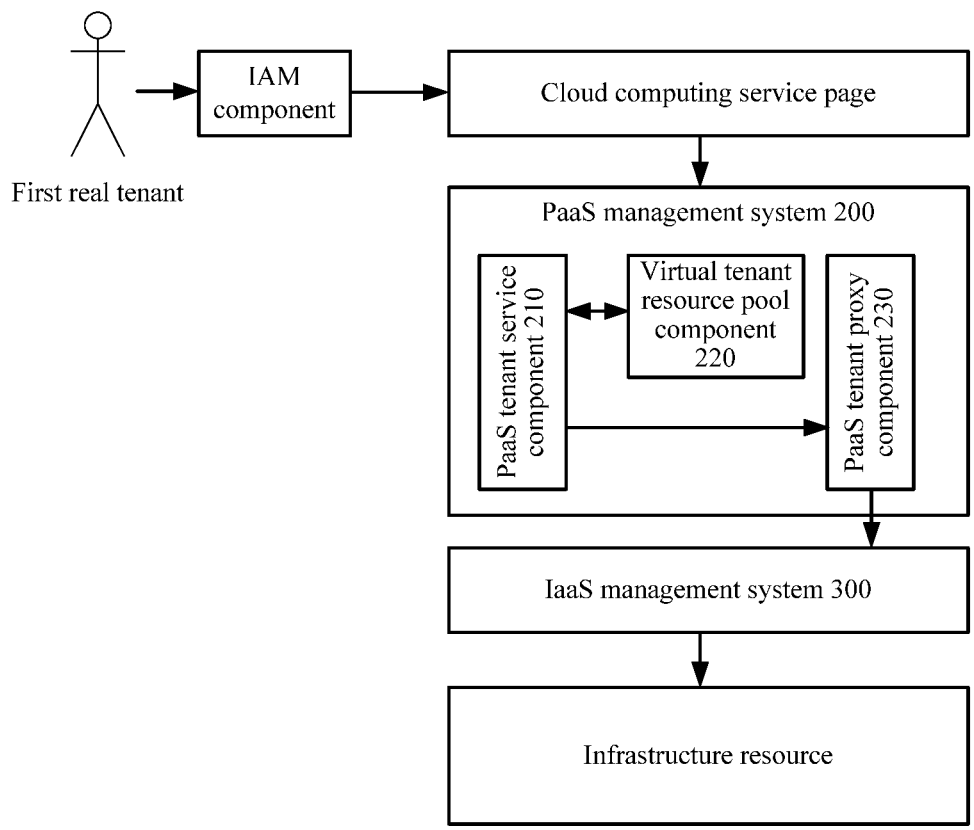
FIG. 2 is a schematic framework of a multi-tenant component that is applied to a PaaS management system according to an embodiment of this application.

The following provides a detailed description with reference to FIG. 2. FIG. 2 is a schematic block diagram of an application PaaS management system 200 according to an embodiment of this application. As shown in FIG. 2, the PaaS management system 200 is a management system of a cloud computing service architecture at a platform (P) layer. In other words, the PaaS management system is a management system configured to process a PaaS operation in the cloud computing service architecture. An IaaS management system 300 is a management system of the cloud computing service architecture at an infrastructure (I) layer. In other words, the IaaS management system is a management system configured to process an IaaS operation in the cloud computing service architecture. For a tenant, for example, a first real tenant, the cloud computing service architecture provides a PaaS service for the first real tenant using the PaaS management system 200. In addition, the cloud computing service architecture may also provide an IaaS service for the first real tenant using the IaaS management system 300. However, this is not limited in this embodiment of this application.

The PaaS management system 200 shown in FIG. 2 includes a PaaS tenant service component 210, a virtual tenant resource pool component 220, and a PaaS tenant proxy component 230.

The PaaS tenant service component 210 is configured to receive a PaaS operation request sent by the first real tenant to the PaaS management system 200. The PaaS operation request is used to indicate a PaaS operation intended for a PaaS resource. Herein the PaaS resource is an infrastructure resource and a software resource on the infrastructure resource. In an embodiment, the PaaS tenant service component 210 is configured to interact with a real tenant and respond to a PaaS operation request from the real tenant. The PaaS tenant service component 210 may be an application deployed in a web container of the infrastructure resource, and provide an interface for a cloud computing service page in an hypertext transfer protocol (HTTP) form. The real tenant may send the PaaS operation request to the PaaS tenant service component 210 using the cloud computing service page. The PaaS tenant service component 210 responds to the PaaS operation request and processes a related PaaS operation, for example, applying for a PaaS instance, restarting a PaaS instance, changing a PaaS instance, or deleting a PaaS instance.

The PaaS tenant service component 210 is further configured to interact with the virtual tenant resource pool component 220 and the PaaS tenant proxy component 230, to perform the PaaS operation for the real tenant. The PaaS tenant service component 210 requests a first virtual tenant corresponding to the first real tenant from the virtual tenant resource pool component 220. The PaaS tenant service component 210 further performs corresponding processing, and separates an IaaS operation corresponding to the PaaS operation indicated by the PaaS operation request, so that the PaaS tenant proxy component 230 performs the IaaS operation subsequently.

It should be understood that, as shown in FIG. 2, the PaaS tenant service component 210 may perform logic such as necessary authentication and a necessary security check using an identity and access management (IAM) component.

The virtual tenant resource pool component 220 is configured to manage one-to-one correspondences between real tenants and virtual tenants. The first real tenant and the first virtual tenant are a pair in the one-to-one correspondences. The virtual tenant resource pool component 220 is further configured to send information about the first virtual tenant to the PaaS tenant service component 210.

In an embodiment, the virtual tenant resource pool component 220 may also be a built-in component, and interacts with the PaaS tenant service component 210 in a form of a program interface. Both the virtual tenant resource pool component 220 and the PaaS tenant service component 210 are deployed in a same application of a same web container. In an embodiment of this application, the cloud computing service architecture may preset a plurality of virtual tenants to form a resource pool that is stored in the virtual tenant resource pool component 220 for use. For a real tenant who leases both the IaaS service and the PaaS service, when the real tenant applies for a PaaS instance for the first time, the PaaS tenant service component 210 initiates an invocation of virtual tenant selection to the virtual tenant resource pool component 220. In this case, the virtual tenant resource pool component 220 allocates an unoccupied virtual tenant to the real tenant from an internal resource pool, records a correspondence between the real tenant and the virtual tenant, and returns information about the virtual tenant to the PaaS tenant service component 210.

After allocating a virtual tenant to each real tenant, the virtual tenant resource pool component 220 records correspondences between real tenants and virtual tenants one by one. In a subsequent PaaS operation request process (for example, when a real tenant re-applies for, changes, or deletes a PaaS instance), the virtual tenant resource pool component 220 directly returns information about a corresponding virtual tenant to the PaaS tenant service component 210.

It should be understood that the real tenant in the embodiments of this application is a tenant who leases the PaaS service and who can initiate a PaaS operation request using the PaaS management system. However, the real tenant does not have permission to manage an infrastructure resource finally corresponding to the PaaS operation request. In other words, the real tenant does not have permission to manage, using the IaaS management system, the infrastructure resource corresponding to the PaaS operation request. Alternatively, the real tenant may be a tenant who leases the IaaS service and who can initiate an IaaS operation request using the IaaS management system. The real tenant has permission to manage an infrastructure resource corresponding to the IaaS operation request initiated by the real tenant using the IaaS management system. For example, the real tenant is registered by a user in the PaaS management system. The user may set a user name and a password for identity authentication performed by the PaaS management system, so that the user can log in to the PaaS management system to use the PaaS service. The virtual tenant is not a tenant who actually exists, but a tenant that is allocated to the real tenant by the PaaS management system, that is used as a proxy for the real tenant, and that has permission to manage the infrastructure resource corresponding to the PaaS operation request. In other words, the virtual tenant has permission to manage, using the IaaS management system, the infrastructure resource corresponding to the PaaS operation request. For example, the virtual tenant is an identification (ID) or a number allocated by the PaaS management system to a registered real tenant. However, the virtual tenant does not have permission to manage the infrastructure resource corresponding to the IaaS operation request initiated by the real tenant using the IaaS management system. For the IaaS management system, the real tenant and the virtual tenant are two different tenants, and the IaaS management system isolates management permission of the real tenant from that of the virtual tenant.

The PaaS tenant proxy component 230 is configured to receive the information about the first virtual tenant and related information of the IaaS operation corresponding to the PaaS operation that are sent by the PaaS tenant service component 210, work as a proxy for the first real tenant using the first virtual tenant, and control the IaaS management system 300 to process the IaaS operation corresponding to the PaaS operation.

In an embodiment, the PaaS tenant proxy component 230 mainly performs identity proxy work for the real tenant, and controls, with a proxy identity of the real tenant, the IaaS management system 300 to manage a corresponding infrastructure resource.

After selecting or retrieving the first virtual tenant corresponding to the first real tenant, the virtual tenant resource pool component 220 sends the information about the first virtual tenant to the PaaS tenant service component 210. The PaaS tenant service component 210 sends the information about the first virtual tenant and the related information of the IaaS operation corresponding to the PaaS operation to the PaaS tenant proxy component 230. The PaaS tenant proxy component 230 works as the proxy for the first real tenant using the first virtual tenant, and controls the IaaS management system 300 to process the IaaS operation corresponding to the PaaS operation, for example, create a virtual machine (VM) (that is, create a PaaS instance), change a VM resource, or delete a VM resource.

Optionally, in this embodiment of this application, the PaaS tenant proxy component 230 may perform authentication on the first virtual tenant using the IAM component, to obtain an identity authentication token of the first virtual tenant. The PaaS tenant proxy component 230 works as the proxy for the first real tenant using the identity authentication token of the first virtual tenant, to initiate a corresponding IaaS operation instruction to the IaaS management system 300.

It should be understood that, in this embodiment of this application, the cloud computing service architecture provides the IaaS service for the first real tenant based on a first infrastructure resource group, only the first real tenant has permission to manage an infrastructure resource in the first infrastructure resource group, the cloud computing service architecture provides the PaaS service for the first real tenant based on a second infrastructure resource group, and only the first virtual tenant has permission to manage an infrastructure resource in the second infrastructure resource group.

According to the PaaS management system in this embodiment of this application, one corresponding virtual tenant is introduced for each real tenant in the PaaS management system, so that the PaaS management system manages an infrastructure resource using the virtual tenant. The first real tenant and the first virtual tenant are a pair in a plurality of one-to-one correspondences. Therefore, PaaS service management corresponding to the first real tenant and management of another tenant are isolated from each other. In this way, management of a plurality of tenants is isolated from each other, and a conflict problem existing between infrastructure resource management performed by the IaaS service and infrastructure resource management performed by the PaaS service can be further resolved.

For the IaaS management system, the real tenant and the virtual tenant are two different tenants, the real tenant has only the permission to manage the infrastructure resource corresponding to the IaaS operation request initiated by the real tenant using the IaaS management system, the virtual tenant has only the permission to manage the infrastructure resource corresponding to the PaaS operation request initiated by the real tenant using the PaaS management system, and the IaaS management system isolates the management permission of the real tenant from that of the virtual tenant. In this way, not only the management conflict problem can be resolved, but also security of a cloud computing service can be improved. The PaaS management system introduces one corresponding virtual tenant for each real tenant. This can ensure mutual resource isolation between a plurality of tenants. In conclusion, according to the PaaS management system in this embodiment of the present disclosure, not only a multi-tenant requirement is met, but also network isolation between infrastructure resources respectively corresponding to the IaaS service and the PaaS service can be performed, thereby resolving the conflict problem existing between infrastructure resource management performed by the IaaS service and infrastructure resource management performed by the PaaS service, and improving the security of the entire cloud computing service.

Figure 3:
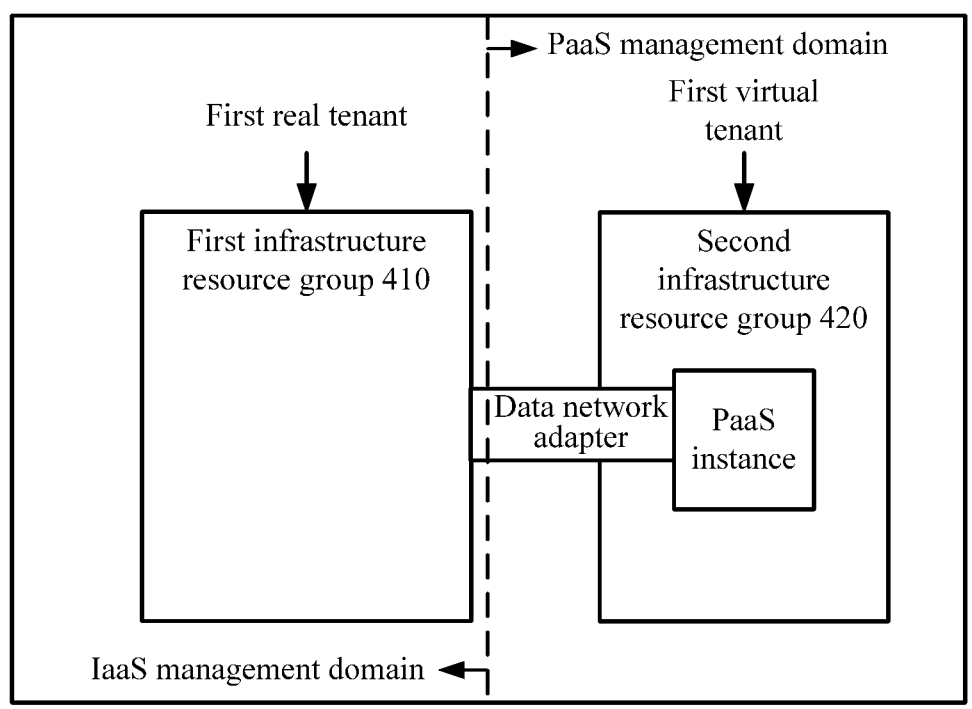
FIG. 3 is a schematic block diagram of a cloud computing service architecture according to an embodiment of this application.

An embodiment of this application further provides a cloud computing service architecture. FIG. 3 is a schematic block diagram of a cloud computing service architecture 400 according to this embodiment of this application. The cloud computing service architecture 400 provides an infrastructure as a service IaaS service and a platform as a service PaaS service for a first real tenant. The cloud computing service architecture 400 includes a first infrastructure resource group 410 and a second infrastructure resource group 420. The cloud computing service architecture 400 provides the IaaS service for the first real tenant based on the first infrastructure resource group 410. Only the first real tenant has permission to manage an infrastructure resource in the first infrastructure resource group 410. The cloud computing service architecture 400 provides the PaaS service for the first real tenant based on the second infrastructure resource group 420. Only a first virtual tenant has permission to manage an infrastructure resource in the second infrastructure resource group 420. There are one-to-one correspondences between real tenants and virtual tenants, and the first real tenant and the first virtual tenant are a pair in the one-to-one correspondences.

In an embodiment, a PaaS management system of the cloud computing service architecture 400 generates a corresponding virtual tenant for each real tenant who accepts the PaaS service. When the first real tenant applies for a PaaS instance, the PaaS management system manages, using an identity of the first virtual tenant, the second infrastructure resource group 420 corresponding to the PaaS instance. For example, an infrastructure resource corresponding to the PaaS instance, such as a VM, a storage medium, a network, or a router, falls within a range of management permission of the first virtual tenant. All operations on the infrastructure resource of the PaaS instance of the first real tenant, that is, all operations on the second infrastructure resource group 420 managed by the first virtual tenant (for example, releasing the PaaS instance, changing the PaaS instance, restarting the PaaS instance, or increasing a disk) can be performed only using the identity of the first virtual tenant corresponding to the first real tenant. In addition, this correspondence can be stored only in a background of the PaaS management system. In other words, the cloud computing service architecture 400 provides the PaaS service for the first real tenant based on the second infrastructure resource group 420, and only the first virtual tenant has the permission to manage the infrastructure resource in the second infrastructure resource group 420. An infrastructure resource created by the PaaS management system belongs to a virtual tenant, only the virtual tenant has permission to manage the infrastructure resource, and a real tenant cannot manage the infrastructure resource using an IaaS management system.

For a case in which the cloud computing service architecture 400 further provides the IaaS service for the first real tenant based on the first infrastructure resource group 410, only the first real tenant has the permission to manage the infrastructure resource in the first infrastructure resource group 410. An infrastructure resource that provides the IaaS service for a real tenant belongs to the real tenant, only the real tenant has permission to manage the infrastructure resource, and a virtual tenant cannot manage the infrastructure resource using the PaaS management system. Herein the first infrastructure resource group 410 and the second infrastructure resource group 420 do not have a same infrastructure resource.

It should be understood that, for a real tenant, in some cases, data communication needs to be performed between infrastructure resources respectively corresponding to the IaaS service and the PaaS service that are leased by the real tenant. The second infrastructure resource group 420 may include a PaaS instance, the PaaS instance includes a data network adapter, and the data network adapter is configured to perform data communication between the PaaS instance and the first infrastructure resource group 410.

In the cloud computing service architecture in this embodiment of this application, for a real tenant who leases both the IaaS service and the PaaS service, infrastructure resources respectively corresponding to the IaaS service and the PaaS service are classified into two parts, at least one of infrastructure resources such as a VM, a network, a CPU, a memory, a storage medium, and a router in the second infrastructure resource group 420 corresponding to the PaaS service is managed by a virtual tenant using the IaaS management system, under control of the real tenant using the PaaS management system, for example, a PaaS management domain shown in FIG. 3, and at least one of infrastructure resources such as a VM, a network, a CPU, a memory, a storage medium, and a router in the first infrastructure resource group 410 corresponding to the IaaS service is managed by the real tenant using the IaaS management system, for example, an IaaS management domain shown in FIG. 3. The real tenant may control application, destruction, and the like of a resource of a PaaS instance using the PaaS management system. In a network of the real tenant, only a network address and a port of the PaaS instance can be seen, and an infrastructure resource corresponding to the PaaS instance cannot be seen. The infrastructure resource corresponding to the PaaS instance can be managed only using the virtual tenant.

A multi-network-adapter design may be used for the PaaS instance, so that a management network and a data network are independent of each other. In an embodiment, in a PaaS instance creation process, a plurality of network adapters may be created on a VM, and a management network adapter and a data network adapter are independent of each other, and belong to the management network and the data network, respectively. Communication in the management network is management communication, and includes internal communication of the PaaS service and control communication of the background of the PaaS management system. Communication in the data network is data communication, is external communication of the PaaS service, and is used to transmit data generated or required in a process in which a user uses the PaaS instance. The PaaS instance (that is, a VM) provided by the cloud computing service architecture for the first real tenant includes a management network adapter. The management network adapter is configured to perform management communication between infrastructure resources in the second infrastructure resource group 420. The management network adapter performs the internal communication of the PaaS service and the control communication of the background of the PaaS management system, and is independent of data communication of the real tenant. The management network is connected to a virtual network of the virtual tenant and is not interfered by the outside. The PaaS instance (that is, a VM) provided by the cloud computing service architecture for the first real tenant includes a data network adapter. The data network adapter is configured to perform data communication between the PaaS instance and the first infrastructure resource group 410. The data network is connected to a virtual network of the real tenant, and can be managed only by the real tenant.

It should be understood that the cloud computing service architecture in this embodiment of this application is configured to provide a hardware or software service for a tenant. The cloud computing service architecture includes an infrastructure resource and software deployed on the infrastructure resource. For example, hardware of the cloud computing service architecture may include one or more of infrastructure resources such as a CPU, a memory, a storage medium, a network, and a router. The hardware of the cloud computing service architecture is connected to each other based on a physical device. Software of the cloud computing service architecture may include the PaaS management system, the IaaS management system, application software corresponding to the PaaS service leased by a tenant, and the like that are deployed on the foregoing hardware. The cloud computing service architecture may deploy the software on the hardware using a virtualization technology. In this embodiment of this application, a specific form of the cloud computing service architecture is not limited.

The real tenant has permission to manage the data network adapter of the PaaS instance. Capabilities of the real tenant such as a security group policy may take effect for the data network adapter. In this way, the real tenant may care about only the data network adapter, and does not need to care about another network adapter. This can simplify management work of the real tenant, and can also enhance a network isolation capability of the infrastructure resource corresponding to the PaaS service. In this embodiment of this application, different real tenants correspond to different virtual tenants, and networks of different virtual tenants are independent and mutually isolated networks. Therefore, for a plurality of tenants of the PaaS service, resources of the tenants are isolated from each other.

FIG. 4 is a schematic flowchart of a method 500 for providing a PaaS service according to an embodiment of this application. The method 500 is based on a cloud computing service architecture. The cloud computing service architecture provides a PaaS service for a first real tenant using a PaaS management system. The method 500 may include the following steps.

S510. The PaaS management system receives a PaaS operation request sent by a first real tenant, where the PaaS operation request is used to indicate a PaaS operation intended for a PaaS resource.

S520. The PaaS management system determines information about a first virtual tenant corresponding to the first real tenant, where there are one-to-one correspondences between real tenants and virtual tenants, and the first real tenant and the first virtual tenant are a pair in the one-to-one correspondences.

S530. The PaaS management system controls, based on the PaaS operation request and the information about the first virtual tenant using the first virtual tenant, an IaaS management system of the cloud computing service architecture to process an IaaS operation corresponding to the PaaS operation.

According to the method for providing a PaaS service in this embodiment of this application, one corresponding virtual tenant is introduced for each real tenant in the PaaS management system, so that the PaaS management system manages an infrastructure resource using the virtual tenant. The first real tenant and the first virtual tenant are a pair in a plurality of one-to-one correspondences. Therefore, PaaS service management corresponding to the first real tenant and management of another tenant are isolated from each other. In this way, management of a plurality of tenants is isolated from each other, and a conflict problem existing between infrastructure resource management performed by an IaaS service and infrastructure resource management performed by a PaaS service can be further resolved.

Figure 5A:
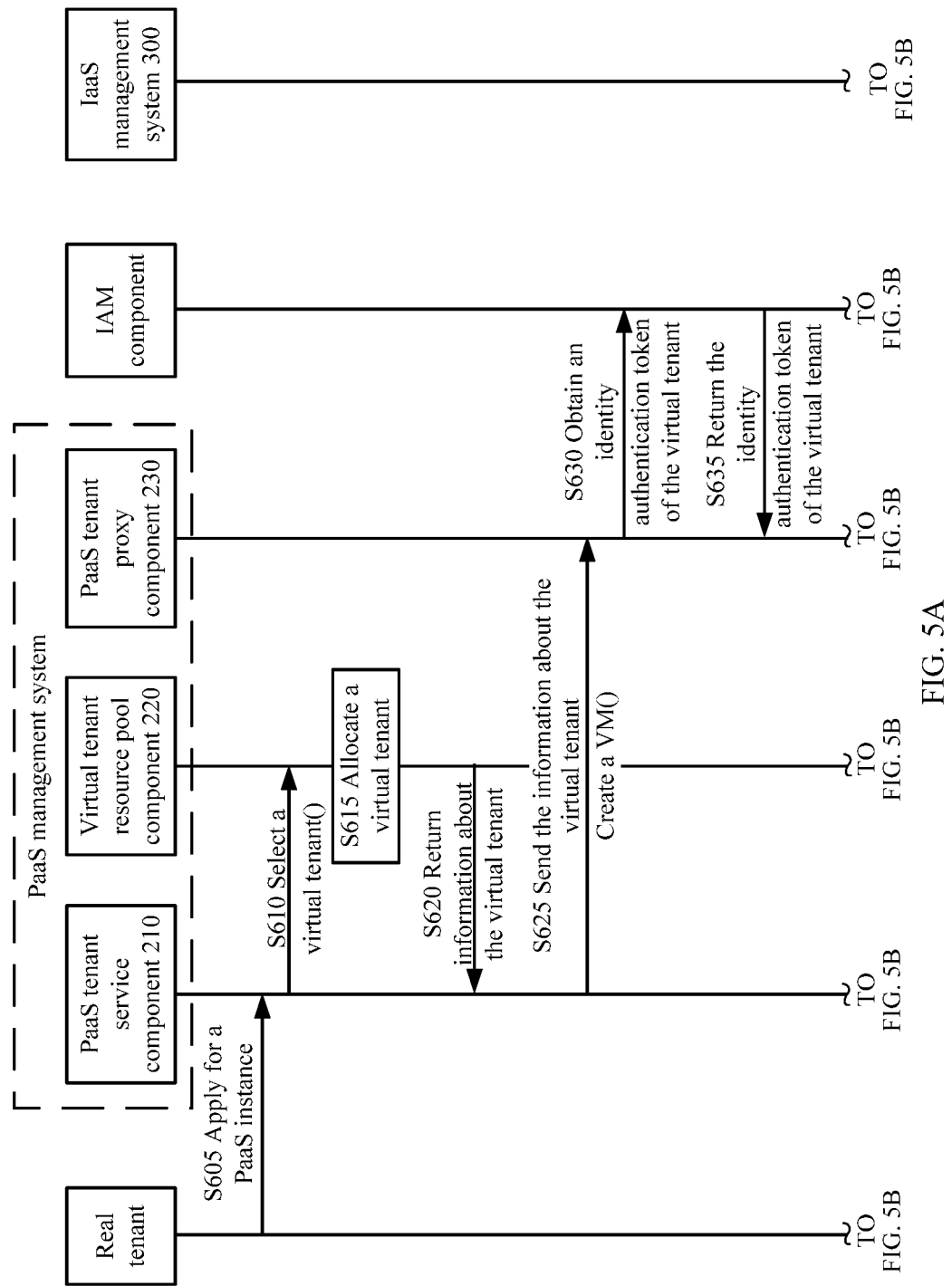
FIG. 5A and FIG. 5B are a schematic flowchart of a method for providing a PaaS service according to another embodiment of this application.
Figure 5B:
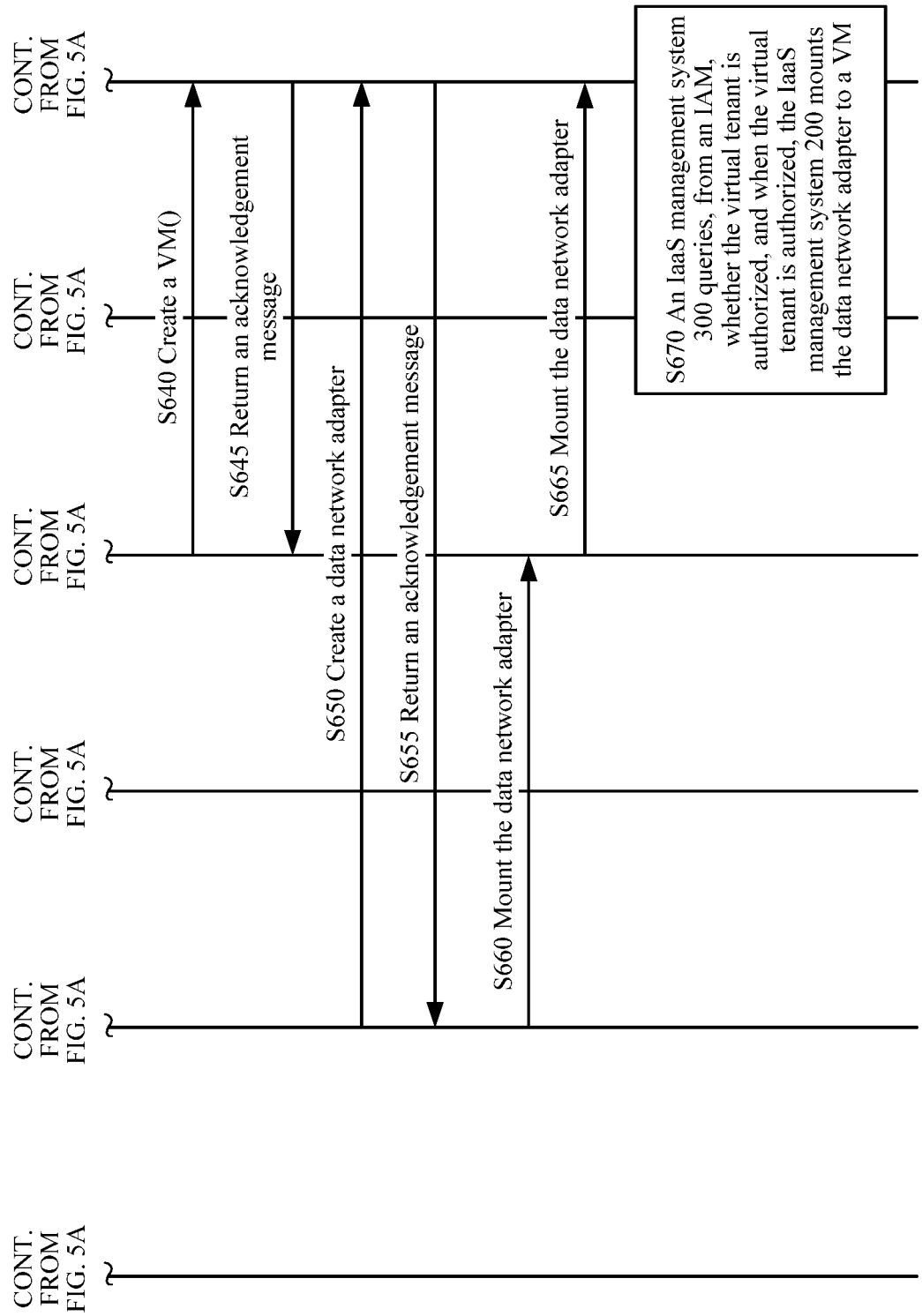

The following describes the method for providing a PaaS service in this embodiment of this application in detail using two specific scenarios. FIG. 5A and FIG. 5B are a schematic flowchart of a method 600 for providing a PaaS service according to an embodiment of this application. That the PaaS management system receives a PaaS operation request sent by a first real tenant in S510 may include receiving, by the PaaS management system, a PaaS operation request that instructs to apply for a PaaS instance and that is sent by the first real tenant. That the PaaS management system controls, based on the PaaS operation request and the information about the first virtual tenant using the first virtual tenant, an infrastructure as a service IaaS management system to process an IaaS operation corresponding to the PaaS operation in S530 may include determining, by the PaaS management system based on the PaaS operation request, that the IaaS operation corresponding to the PaaS operation is creating the PaaS instance and creating a data network adapter, and controlling, by the PaaS management system using the first virtual tenant, the IaaS management system to create the PaaS instance and create the data network adapter.

FIG. 5A and FIG. 5B are a schematic flowchart of a method for providing a PaaS service according to an embodiment of this application. A scenario shown in FIG. 5A and FIG. 5B is a scenario in which a real tenant applies for a PaaS instance for the first time. As shown in FIG. 5A and FIG. 5B, the scenario in which a real tenant applies for a PaaS instance for the first time may include the following procedure.

S605. A real tenant clicks an "Apply for a PaaS instance" button on a cloud computing service page that may also be referred to as a PaaS console. The cloud computing service page sends an HTTP message to a PaaS management system, for example, to a PaaS tenant service component 210.

S610. The PaaS tenant service component 210 initiates an invocation of virtual tenant selection, namely, "select a virtual tenant( )", to a virtual tenant resource pool component 220.

S615. The virtual tenant resource pool component 220 allocates an unoccupied virtual tenant to the real tenant from an internal resource pool of the virtual tenant resource pool component 220, and records a correspondence between the real tenant and the virtual tenant.

S620. The virtual tenant resource pool component 220 returns information about the virtual tenant to the PaaS tenant service component 210.

S625. After receiving the information about the virtual tenant, the PaaS tenant service component 210 transfers the information about the virtual tenant to a PaaS tenant proxy component 230, and also initiates an invocation of VM creation, namely, "create a VM( )".

S630. After receiving the invocation of VM creation, the PaaS tenant proxy component 230 sends an HTTP message to an JAM component, to obtain an identity authentication token of the virtual tenant.

S635. The JAM component returns the identity authentication token of the virtual tenant to the PaaS tenant proxy component 230.

S640. After obtaining the identity authentication token, the PaaS tenant proxy component 230 initiates an HTTP message for creating a VM (that is, creating a PaaS instance) to an IaaS management system 300.

S645. After successfully creating a VM, the IaaS management system 300 returns an acknowledgement message to the PaaS tenant proxy component 230.

S650. After the VM is successfully created, the PaaS tenant service component 210 initiates an HTTP message for creating a data network adapter to the IaaS management system 300, to instruct the IaaS management system 300 to create a data network adapter that is configured to communicate with a first infrastructure resource group.

S655. After creating the data network adapter, the IaaS management system 300 returns an acknowledgement message to the PaaS tenant proxy component 230.

S660. The PaaS tenant service component 210 initiates a data network adapter mounting message to the PaaS tenant proxy component 230.

S665. After receiving the data network adapter mounting message, the PaaS tenant proxy component 230 initiates an HTTP message that instructs to mount the data network adapter onto the VM to the IaaS management system 300.

S670. For an operation of mounting the data network adapter onto the VM, the IaaS management system 300 queries, from the IAM component, whether the virtual tenant is authorized, and when the virtual tenant is authorized, the IaaS management system 300 can perform the operation of mounting the data network adapter to the VM.

Only in this case, the PaaS management system can allow the data network adapter of the real tenant to be mounted onto the virtual tenant, so that a resource of a VM of a PaaS is connected to a network of the real tenant using the data network adapter of the real tenant.

Figure 6:
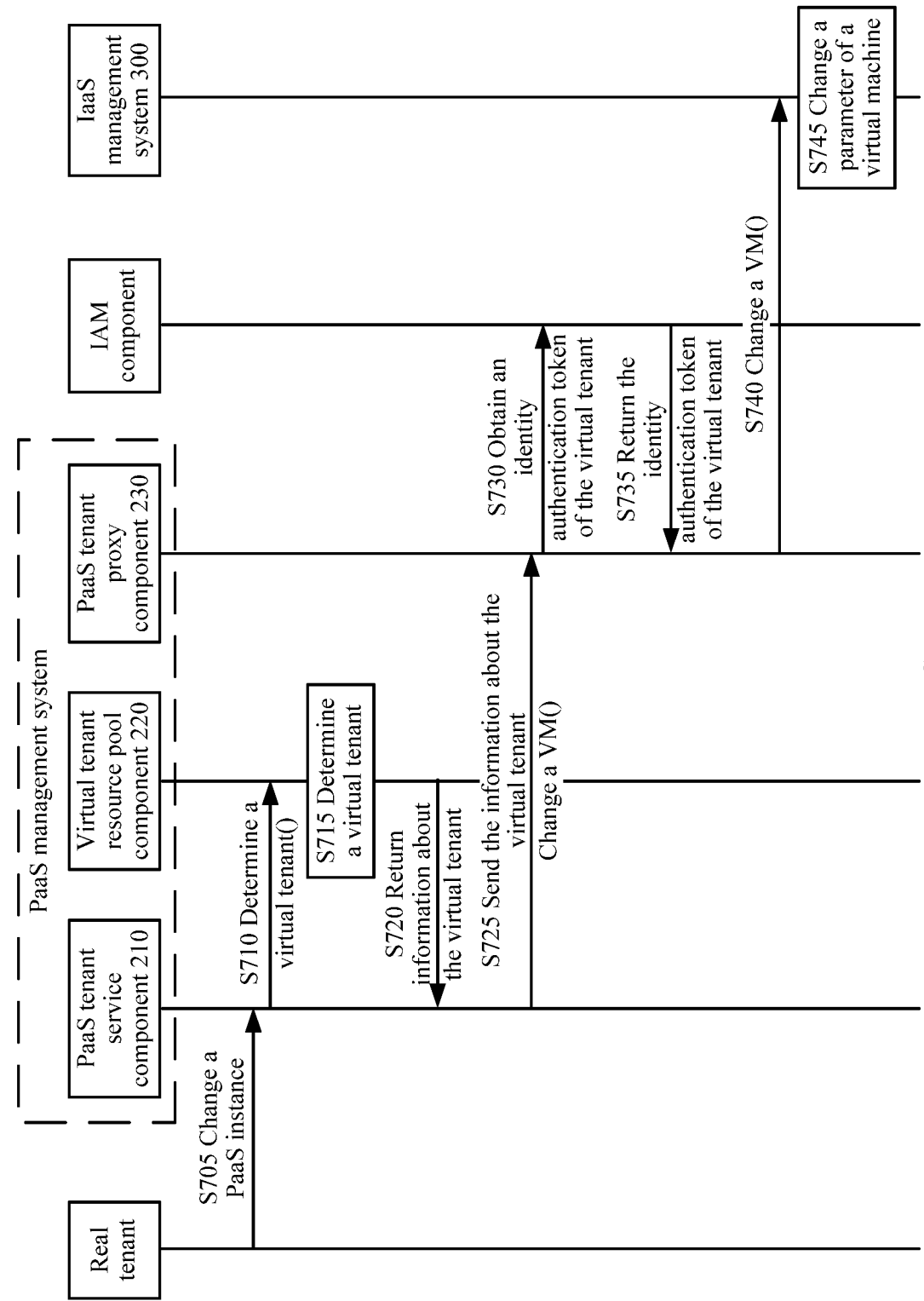
FIG. 6 is a schematic flowchart of a method for providing a PaaS service according to another embodiment of this application.

FIG. 6 is a schematic flowchart of a method 700 for providing a PaaS service according to an embodiment of this application. A scenario shown in FIG. 6 is a scenario in which a real tenant changes a PaaS instance. That the PaaS management system receives a PaaS operation request sent by a first real tenant in S510 may include receiving, by the PaaS management system, a PaaS operation request that instructs to change a PaaS instance and that is sent by the first real tenant. That the PaaS management system controls, based on the PaaS operation request and the information about the first virtual tenant using the first virtual tenant, an infrastructure as a service IaaS management system to process an IaaS operation corresponding to the PaaS operation in S530 may include determining, by the PaaS management system based on the PaaS operation request, that the IaaS operation corresponding to the PaaS operation is changing a parameter of the PaaS instance, and controlling, by the PaaS management system using the first virtual tenant, the IaaS management system to change the parameter of the PaaS instance.

As shown in FIG. 6, the scenario in which a real tenant changes a PaaS instance may include the following procedure.

S705. A real tenant clicks a "Change a PaaS instance" button on a cloud computing service page. The cloud computing service page sends an HTTP message to a PaaS management system, specifically, to a PaaS tenant service component 210.

S710. The PaaS tenant service component 210 initiates an invocation of virtual tenant determining, namely, "determine a virtual tenant( )", to a virtual tenant resource pool component 220.

S715. The virtual tenant resource pool component 220 determines, based on recorded correspondences between real tenants and virtual tenants, a virtual tenant corresponding to the real tenant.

S720. The virtual tenant resource pool component 220 returns information about the virtual tenant to the PaaS tenant service component 210.

S725. After receiving the information about the virtual tenant, the PaaS tenant service component 210 transfers the information about the virtual tenant to a PaaS tenant proxy component 230, and also initiates an invocation of VM changing, namely, "change a VM( )".

S730. After receiving the invocation of VM changing, the PaaS tenant proxy component 230 sends an HTTP message to an IAM component, to obtain an identity authentication token of the virtual tenant.

S735. The PaaS tenant proxy component 230 obtains the identity authentication token.

S740. After obtaining the identity authentication token, the PaaS tenant proxy component 230 initiates an HTTP message for changing a VM to an IaaS management system 300.

S745. After receiving the HTTP message for changing a VM, the IaaS management system 300 changes a parameter of a VM.

Figure 7:
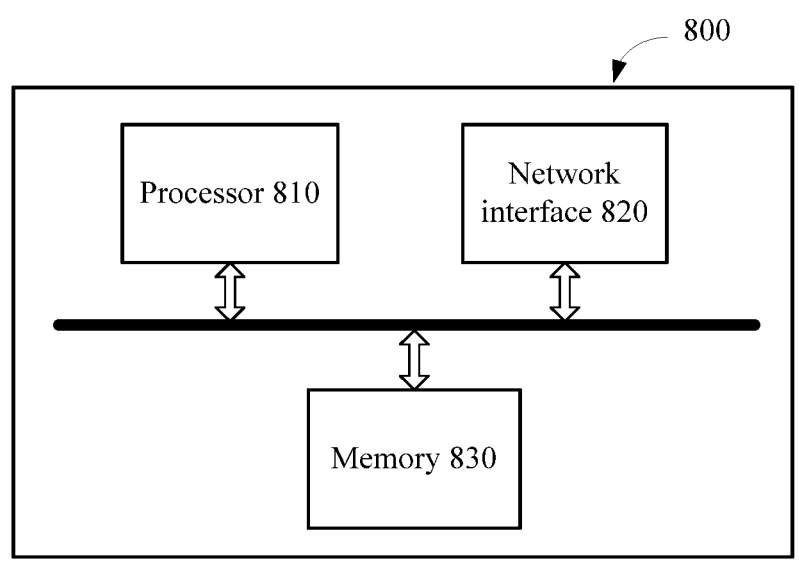
FIG. 7 is a schematic block diagram of a PaaS management system according to another embodiment of this application.

It should be noted that, in the embodiments of this application, the receiving module 110 of the PaaS management system may be implemented by a network interface, and the processing module 120 may be implemented by a processor. As shown in FIG. 7, a PaaS management system 800 may include a processor 810, a network interface 820, and a memory 830. The memory 830 may be configured to store an instruction executed by the processor 810, and the like. The processor 810 and the network interface 820 are configured to execute the instruction stored in the memory

830. When the processor 810 and the network interface 820 execute the instruction stored in the memory 830, the PaaS management system 800 is configured to perform the method for providing a PaaS service in the embodiments of this application.

Components in the PaaS management system 800 may communicate with each other using an internal connection channel, to transfer a control signal and/or a data signal.

It should be noted that the foregoing method embodiments of this application may be applied to a processor, or implemented by a processor. The processor may be an integrated circuit chip and has a signal processing capability. In an implementation process, steps in the foregoing method embodiments can be implemented using an integrated logic circuit of hardware in the processor, or using instructions in a form of software. The processor may be a general-purpose processor, a digital signal processor (-DSP), an application specific integrated circuit (ASIC), a field programmable gate array (FPGA) or another programmable logic device, a discrete gate or transistor logic device, or a discrete hardware component. The processor may implement or perform the methods, the steps, and logical block diagrams that are disclosed in the embodiments of this application. The general-purpose processor may be a microprocessor or the processor may be any conventional processor, or the like. Steps of the methods disclosed with reference to the embodiments of this application may be directly executed and accomplished by a hardware decoding processor, or may be executed and accomplished using a combination of hardware and software modules in a decoding processor. The software module may be located in a mature storage medium in the art, such as a random access memory, a flash memory, a ROM, a programmable read-only memory (PROM), an electrically erasable programmable memory (EEPROM), or a register. The storage medium is located in the memory, and the processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a ROM, a PROM, an erasable programmable read-only memory (EPROM), an EEPROM, or a flash memory. The volatile memory may be RAM, used as an external cache. As examples but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus random access memory (DR RAM). It should be noted that the memory of the systems and methods described in this specification includes but is not limited to these memories and any memory of another proper type.

The network interface is configured to receive a PaaS operation request sent by a first real tenant. The network interface 820 may be one network interface, or may be a plurality of network interfaces. The network interface may be a wired interface, for example, a fiber distributed data interface (FDDI) or a gigabit Ethernet (GE) interface, or the network interface may be a wireless interface. A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an embodiment. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to other approaches, or some of the technical solutions may be implemented in a form of a software product. The software product is stored in a storage medium, and includes several instructions for instructing a computer device (which may be a personal computer, a server, a network device, or the like) to perform all or some of the steps of the methods described in the embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A platform as a service (PaaS) method, implemented by a PaaS management system, comprising:
  receiving, from a first real tenant, a PaaS operation request indicating a PaaS operation intended for a PaaS resource, wherein the PaaS operation request instructs application for a PaaS instance;

determining whether a first infrastructure as a service (IaaS) operation associated with the PaaS operation will create the PaaS instance and a data network adapter based on the PaaS operation request;

controlling, using a first virtual tenant, an IaaS management system to create the PaaS instance and the data network adapter;

determining a first virtual tenant for the first real tenant, wherein the first virtual tenant is used as a proxy for the real tenant, wherein a plurality of real tenants are in a one-to-one correspondence with a plurality of virtual tenants, and wherein the first real tenant of the plurality of real tenants is in a one-to-one correspondence with the first virtual tenant of the plurality of virtual tenants; and controlling, using the first virtual tenant, the IaaS management system to process the first IaaS operation associated with the PaaS operation to access a first infrastructure resource based on the PaaS operation request and the information about the first virtual tenant, wherein the first real tenant only has permission to manage a second infrastructure resource corresponding to a second IaaS operation using the IaaS management system, wherein the first real tenant does not have permission to manage the first infrastructure resource corresponding to the PaaS operation, wherein the first virtual tenant only has permission to manage the first infrastructure resource corresponding to the first IaaS operation associated with the PaaS operation, and wherein the first virtual tenant does not have permission to manage the second infrastructure resource corresponding to the second IaaS operation using the IaaS management system.

2. The PaaS method of claim 1, wherein controlling the IaaS management system further comprises processing the second IaaS operation in a cloud computing service architecture that provides an IaaS service for the first real tenant based on a second infrastructure resource group comprising the second infrastructure resource, wherein the method further comprises processing the PaaS operation in the cloud computing service architecture, and wherein the cloud computing service architecture provides a PaaS service for the first real tenant based on a first infrastructure resource group comprising the first infrastructure resource.

3. The PaaS method of claim 2, further comprising:
providing a PaaS instance by the cloud computing service architecture for the first real tenant using a management network adapter; and
managing communication between infrastructure resources in the first infrastructure resource group using the management network adapter.

4. The PaaS method of claim 2, further comprising:
providing a PaaS instance by the cloud computing service architecture for the first real tenant using a data network adapter; and
communicating data between the PaaS instance and the first infrastructure resource group using the data network adapter.

5. The PaaS method of claim 1, wherein the PaaS operation request instructs the PaaS management system to change a PaaS instance, wherein the method further comprises:
determining, that the first IaaS operation associated with the PaaS operation changes a parameter of the PaaS instance based on the PaaS operation request; and controlling, by using the first virtual tenant, the IaaS management system to change the parameter of the PaaS instance.

6. A cloud computing service architecture, comprising:
a first infrastructure resource group including a first infrastructure resource corresponding to an infrastructure as a service (IaaS) operation processed using an IaaS management system;
a second infrastructure resource group including a second infrastructure resource corresponding to platform as a service (PaaS) operation request using a PaaS management system;
a memory coupled to the first infrastructure resource group and the second infrastructure resource group, wherein the memory is configured to store instructions; and
a processor coupled to the memory, the first infrastructure resource group, and the second infrastructure resource group, wherein the processor is configured to execute the instructions, which cause the cloud computing service architecture to be configured to:
receive, from a first real tenant, a PaaS operation request indicating a PaaS operation intended for a PaaS resource, wherein the PaaS operation request instructs application for a PaaS instance;
determine whether the first IaaS operation associated with the PaaS operation will create the PaaS instance and a data network adapter based on the PaaS operation request; and;
control, using a first virtual tenant, the IaaS management system to create the PaaS instance and the data network adapter;
allocate a first virtual tenant for a first real tenant, wherein the first virtual tenant is used as a proxy for the real tenant, wherein a plurality of real tenants are in a one-to-one correspondence with a plurality of virtual tenants, and wherein the first real tenant of the plurality of real tenants is in a one-to-one correspondence with the first virtual tenant of the plurality of virtual tenants;
provide the IaaS and the PaaS for the first real tenant;
provide the IaaS for the first real tenant based on the first infrastructure resource group;
provide the PaaS for the first real tenant based on the second infrastructure resource group, wherein the first real tenant only has permission to manage the first infrastructure resource corresponding to a first IaaS operation using the IaaS management system, wherein the first real tenant does not have permission to manage the second infrastructure resource corresponding to a second IaaS operation associated with the PaaS operation, wherein the first virtual tenant only has permission to manage the second infrastructure resource corresponding to the second IaaS operation associated with the PaaS operation, and the first virtual tenant does not have permission to manage the first infrastructure resource corresponding to the first IaaS operation using the IaaS management system.

7. The cloud computing service architecture of claim 6, wherein the second infrastructure resource group comprises a PaaS instance, wherein the PaaS instance comprises a data network adapter, and wherein the data network adapter is configured to communicate data between the PaaS instance and the first infrastructure resource group.

8. A platform as a service (PaaS) management system, comprising:

a network interface;

a processor coupled to the network interface; and a memory, coupled to the processor and the network interface, storing instructions that, when executed by the processor and the network interface, cause the PaaS management system to be configured to:
- receive, from a first real tenant, a PaaS operation request indicating a PaaS operation intended for a PaaS resource, wherein the PaaS operation request instructs application for a PaaS instance;
- determine whether a first infrastructure as a service (IaaS) operation associated with the PaaS operation will create the PaaS instance and a data network adapter based on the PaaS operation request;
- control, using a first virtual tenant, an IaaS management system to create the PaaS instance and the data network adapter;
- allocate a first virtual tenant for the first real tenant, wherein the first virtual tenant is used as a proxy for the real tenant, wherein a plurality of real tenants are in a one-to-one correspondence with a plurality of virtual tenants, and wherein the first real tenant of the plurality of real tenants is in a one-to-one correspondence with the first virtual tenant of the plurality of virtual tenants; and
- control, using the first virtual tenant, the IaaS management system to process the first IaaS operation associated with the PaaS operation to access a first infrastructure resource based on the PaaS operation request and the information about the first virtual tenant, wherein the first real tenant only has permission to manage a second infrastructure resource corresponding to a second IaaS operation using the IaaS management system, wherein the first real tenant does not have permission to manage the first infrastructure resource corresponding to the PaaS operation, wherein the first virtual tenant only has permission to manage the first infrastructure resource corresponding to the first IaaS operation associated with the PaaS operation request, and wherein the first virtual tenant does not have permission to manage the second infrastructure resource corresponding to the second IaaS operation.

9. The PaaS management system of claim 8, wherein the instructions further cause the PaaS management system to be configured to process the second IaaS operation in a cloud computing service architecture that provides an IaaS service for the first real tenant based on a second infrastructure resource group comprising the second infrastructure resource, wherein the instructions further cause the PaaS management system to be configured to process the PaaS operation in the cloud computing service architecture, and wherein the cloud computing service architecture provides a PaaS service for the first real tenant based on a first infrastructure resource group comprising the first infrastructure resource.

10. The PaaS management system of claim 9, wherein the instructions further cause the PaaS management system to be configured to:
- provide a PaaS instance by the cloud computing service architecture for the first real tenant using a management network adapter; and
- manage communication between infrastructure resources in the first infrastructure resource group using the management network adapter.

11. The PaaS management system of claim 9, wherein the instructions further cause the PaaS management system to be configured to:
- provide a PaaS instance by the cloud computing service architecture for the first real tenant using a data network adapter; and
- communicate data between the PaaS instance and the first infrastructure resource group using the data network adapter.

12. The PaaS management system of claim 8, wherein the PaaS operation request instructs the PaaS management system to change a PaaS instance, wherein the instructions further cause the PaaS management system to be configured to:
- determine that the first IaaS operation associated with the PaaS operation changes a parameter of a PaaS instance based on the PaaS operation request; and
- control, by using the first virtual tenant, the IaaS management system to change the parameter of the PaaS instance.

13. A computer program product comprising computer-executable instructions stored on a non-transitory computer-readable medium that, when executed by a processor, cause the processor to be configured to:
- receive, from a first real tenant, a PaaS operation request indicating a PaaS operation intended for a PaaS resource, wherein the PaaS operation request instructs application for a PaaS instance;
- determine whether a first infrastructure as a service (IaaS) operation associated with the PaaS operation will create the PaaS instance and a data network adapter based on the PaaS operation request;
- control, using a first virtual tenant, an IaaS management system to create the PaaS instance and the data network adapter;
- determine information about a first virtual tenant corresponding to the first real tenant, wherein the first virtual tenant is used as a proxy for the real tenant, wherein a plurality of real tenants are in a one-to-one correspondence with a plurality of virtual tenants, and wherein the first real tenant of the plurality of real tenants is in a one-to-one correspondence with the first virtual tenant of the plurality of virtual tenants; and
- control, using the first virtual tenant, the IaaS management system to process the first IaaS operation associated with the PaaS operation to access a first infrastructure resource based on the PaaS operation request and the information about the first virtual tenant, wherein the first real tenant only has permission to manage a second infrastructure resource corresponding to a second IaaS operation using the IaaS management system, wherein the first real tenant does not have permission to manage the first infrastructure resource corresponding to the PaaS operation, wherein the first virtual tenant only has permission to manage the first infrastructure resource corresponding to the first IaaS operation associated with the PaaS operation, and wherein the first virtual tenant does not have permission to manage the second infrastructure resource corresponding to the second IaaS operation using the IaaS management system.

14. The computer program product of claim 13, wherein the instructions further cause the processor to process the second IaaS operation in a cloud computing service architecture that provides an IaaS service for the first real tenant based on a second infrastructure resource group comprising the second infrastructure resource, wherein the computer-executable instructions further cause the processor to be configured to process the PaaS operation in the cloud computing service architecture, and wherein the cloud computing service architecture provides a PaaS service for the first real tenant based on a first infrastructure resource group comprising the first infrastructure resource.

15. The computer program product of claim 14, wherein the instructions further cause the processor to:
provide a PaaS instance by the cloud computing service architecture for the first real tenant using a management network adapter; and
manage communication between infrastructure resources in the first infrastructure resource group using the management network adapter.

16. The computer program product of claim 14, wherein the instructions further cause the processor to:
provide a PaaS instance by the cloud computing service architecture for the first real tenant using a data network adapter; and
communicate data between the PaaS instance and the first infrastructure resource group using the data network adapter.

17. The computer program product of claim 13, wherein the PaaS operation request configured to instruct a PaaS management system to change a PaaS instance, wherein the instructions further cause the processor to:
determine that the first IaaS operation associated with the PaaS operation changes a parameter of the PaaS instance based on the PaaS operation request; and
control, by using the first virtual tenant, the IaaS management system to change the parameter of the PaaS instance.

* * * * *